United States Patent
Cramer et al.

(10) Patent No.: US 6,170,381 B1
(45) Date of Patent: Jan. 9, 2001

(54) CONTROL VALVE SEAL

(75) Inventors: Kim David Cramer, New Troy; James Boyd Malosh, Baroda, both of MI (US)

(73) Assignee: Robert Bosch Corporation, Broadview, IL (US)

(*) Notice: Under 35 U.S.C. 154(b), the term of this patent shall be extended for 0 days.

(21) Appl. No.: 09/168,951

(22) Filed: Oct. 9, 1998

(51) Int. Cl.[7] .................................................. F15B 9/10

(52) U.S. Cl. ................................................ 91/49; 91/376 R

(58) Field of Search ...................................... 91/49, 376 R

(56) References Cited

U.S. PATENT DOCUMENTS 5,339,722 * 8/1994 Mauro et al. ....................... 91/376 R

* cited by examiner

Primary Examiner—F. Daniel Lopez
(74) Attorney, Agent, or Firm—Leo H. McCormick, Jr.; Warren Comstock

(57) ABSTRACT

A fluid power apparatus having a housing with a bore therein which is divided by a power piston into an inlet chamber and an outlet chamber. The power piston has a passageway for connecting the inlet chamber with an outlet chamber. A valve arrangement controls the flow of a fluid under pressure from a source through the passageway. The valve arrangement including a valve seal, a valve spring and an input rod. The valve spring urges the valve seal into engagement with the input rod to define a working chamber within said passageway. The fluid under pressure flows from the inlet chamber to the outlet chamber by passing between the valve seal and a valve seat located in the working chamber. The flowing of fluid past the valve seat in a rest mode of operation develops a turbulence which creates a broad band non-resonance sound having an acceptable audible level of approximately 30 dB. The input rod responds to an actuation force from an operator by moving the valve seal toward the valve seat to restrict the flow of fluid from the working chamber. The restriction in the flow of fluid causes a corresponding fluid pressure change of the fluid in the inlet chamber. This corresponding fluid pressure change acts on the power piston to create an output force. The restriction in the flow of fluid from the working chamber creates a turbulence which produces an undesirable resonance noise. The valve seal is characterized by a labyrinth ring located on a face which modifies the level of turbulence and shifts the frequency of the fluid flowing past the valve seat such that the resonance noise of the fluid is below an acceptable audible range of 65 dB.

7 Claims, 2 Drawing Sheets

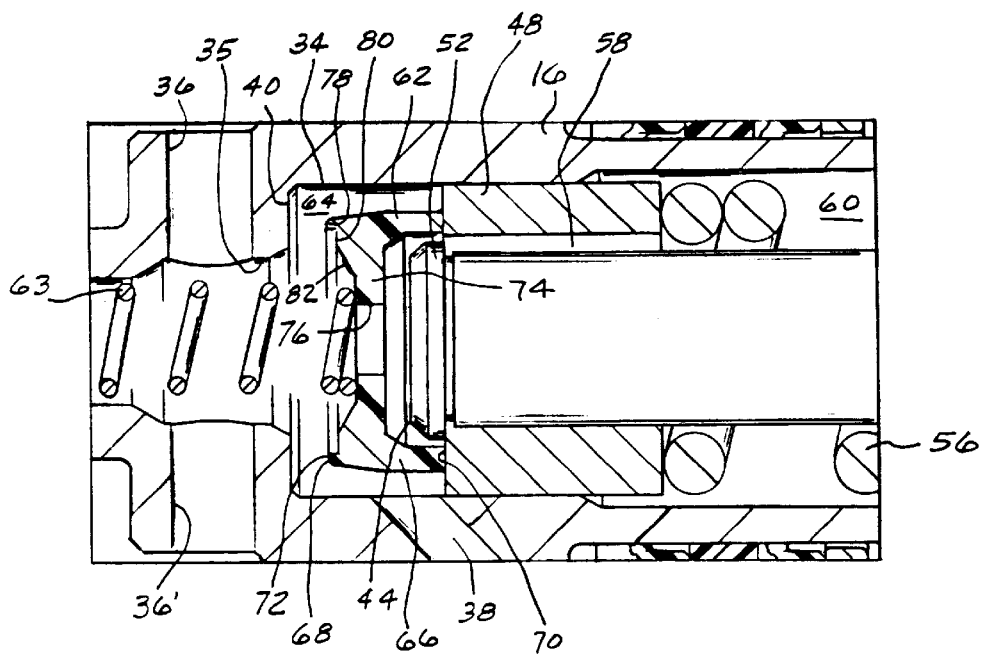
Fig. 2
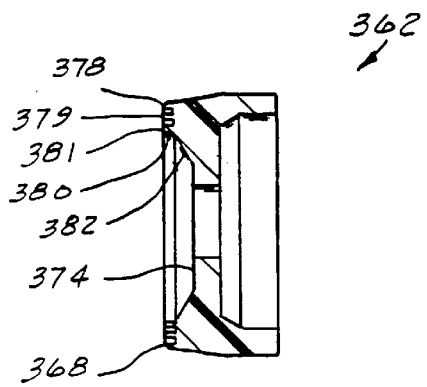
Fig. 3  Fig. 4
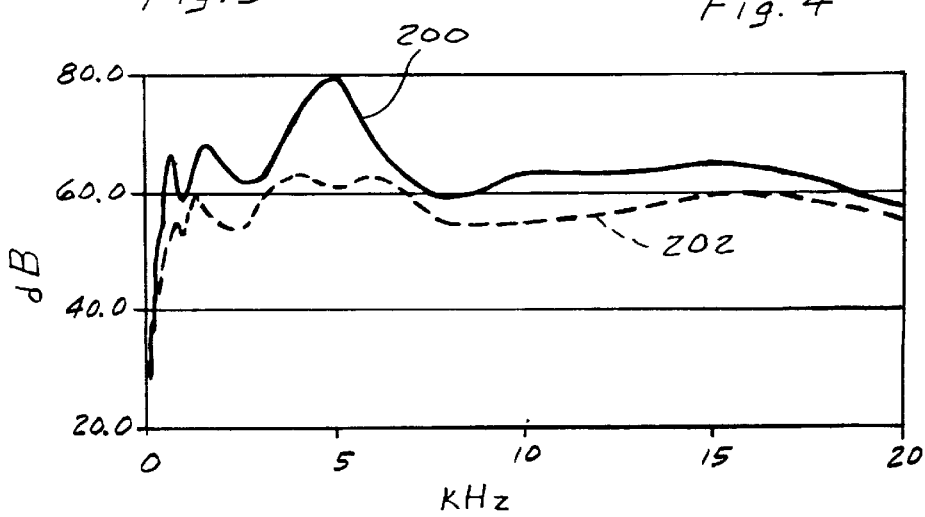
Fig. 5

CONTROL VALVE SEAL

This invention relates to a seal of a control valve for a brake booster wherein a structural relationship with a seat modifies turbulence created upon the restriction in the flow of fluid from an inlet port to an outlet port to attenuate the development of undesirable audible noise.

BACKGROUND OF THE INVENTION

The structural components in hydraulic brake boosters, such as illustrated in U.S. Pat. No. 4,961,846, are designed to permit fluid under pressure in a fluid supply system to continually flow from an inlet port through a power piston to an outlet port when in an inactive or rest position. In actuation position, an input force applied to a control valve moves the control valve toward a valve seat in the power piston to restrict the flow of fluid present in an inlet chamber and create a fluid pressure differential across the power piston. After overcoming a return spring, the pressure differential acts on and moves the power piston to develop an output force. When the control valve is in the rest position, fluid freely flows through the power piston and creates essentially a broad band non-resonance sound. This broad band non-resonance sound is combined with noises produced by the engine and other components in a vehicle and is accepted as a total overall operational sound of the vehicle. When the flow of fluid through the power piston is restricted, a corresponding resonant frequency is created by the flow of fluid to the outlet port which is manifested as an undesirable noise or audible resonant sound.

SUMMARY OF THE INVENTION

In evaluating the development of undesirable noise or audible sounds in such brake boosters, it was concluded that such noise was generated by turbulence in the fluid caused when restricting the flow of fluid past a valve seat. Such turbulence develops a frequency in the fluid which locks on to a corresponding resonance frequency in the brake booster and creates an undesirable audible sound. In the present invention, a valve seal is designed to attenuate the development of turbulence in the flow of fluid by shifting its frequency to attenuate or prevent the locking on to with the resonant frequency of the brake booster.

According to the present invention, the fluid power apparatus has a housing with a bore therein which is divided by a power piston into an inlet chamber and an outlet chamber. The power piston has a passageway therethrough for connecting the inlet chamber with the outlet chamber. A valve is located in the passageway for controlling the flow of a fluid under pressure from a source through the power piston. The valve including a valve seal, a valve spring and an input rod. The valve spring urges the valve seal into engagement with the input rod to define a working chamber within the passageway. Fluid under pressure flows from the inlet chamber to the outlet chamber after passing between the valve seal and a valve seat located in the working chamber. When the control valve is in the rest position, fluid freely flows past the valve seat and creates a first turbulence therein to produces a first resonance frequency that is manifested as an acceptable audible sound. When the input rod is moved by an operator to effect a brake application, the valve seal is moved toward the valve seat to restrict the flow of fluid from the working chamber. The restriction in the flow of fluid across the valve seat causes a corresponding increase in the fluid pressure present in the working and inlet chambers. The increase in fluid pressure acts on the power piston to create an output force. The decrease in the flow of fluid from the working chamber creates a change in the turbulence in the fluid which produces a corresponding variable frequency noise or sound. The valve seal which is characterized by a of a cylindrical body with a labyrinth ring located on a face for modifying the level of the turbulence in the fluid flowing past the valve seat such that the audible sound of a resulting variable resonance frequency resonance of the fluid is within an acceptable audible range.

An advantage of a brake booster using this invention resides in its operation within an audible accepted noise range.

A further advantage of the brake boosters of this invention is provided through the use of a valve seal having a face with a labyrinth ring which compensates for a pressure drop across a valve seat to attenuate turbulent noise energy in the fluid communicated to an outlet chamber of the brake booster and as a result an acceptable sound level of operation.

BRIEF DESCRIPTION OF THE DRAWINGS

FIG. 2 is an enlarged sectional view of the circumscribed area of the control valve of FIG. 1;

FIG. 3 is a sectional view of a valve seal having a plurality of labyrinth rings for use in the brake booster of FIG. 1;

FIG. 4 is a sectional view of another valve seal having a plurality of labyrinth rings for use in the brake booster of FIG. 1; and FIG. 5 is a trace of the audible sounds produced by the brake booster of FIG. 1 and of sounds produced by a base line booster.

DETAILED DESCRIPTION

Figure 1:
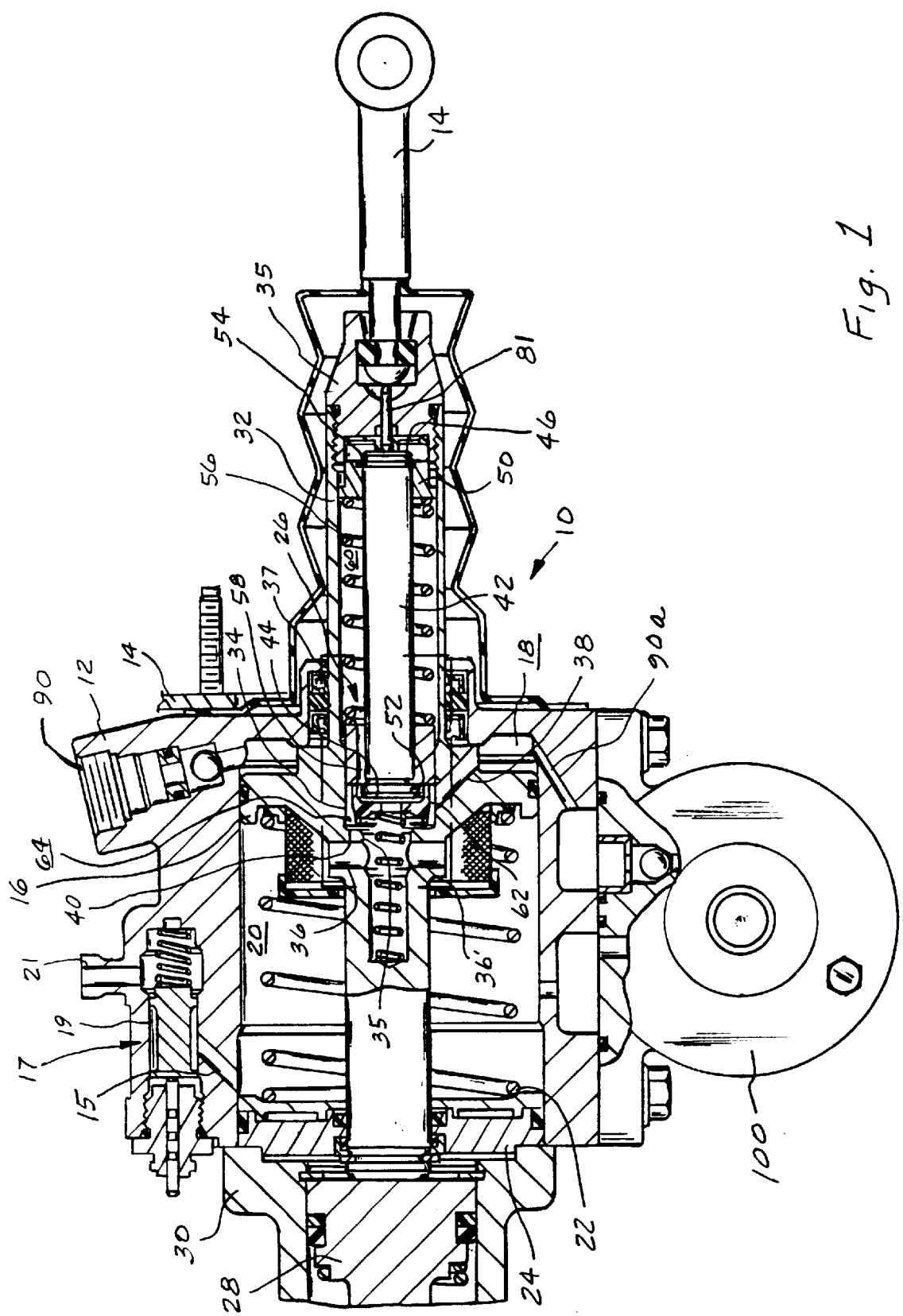
FIG. 1 is a schematic illustration of a brake booster which includes a brake seal made according to the present invention.

The brake booster 10 as shown in FIG. 1 for use in a brake system is of a type disclosed in U.S. Pat. No. 4,961,846. The brake booster has a housing 12 which is secured to a dash panel of a vehicle and connected with an input rod 14 of a brake pedal for effecting a brake application in response to an input force applied by an operator. The housing 12 has an internal cavity which is divided by a power piston 16 into an inlet chamber 18 and an outlet chamber 20. A return spring 22 located in the internal cavity has a first end which engages a closure end wall 24 of housing 12 and a second end which biases the power piston 16 toward the inlet chamber 18. Power piston 16 has passageway for connecting the inlet chamber 18 with the outlet chamber 20. A control valve 26 located in the passageway responds to an input force applied by the brake pedal to input rod 14 to restrict the flow of fluid under pressure from the inlet chamber 18 toward the outlet chamber 20. The restriction in the flow of fluid toward the outlet chamber 20 creates a corresponding increase in the fluid pressure of the fluid in the inlet chamber 18. This increase in fluid pressure results in the creation of a pressure differential across the power piston 16. This pressure differential acts on and after overcoming the force of return spring 22, moves the power piston 16 toward the outlet chamber 20 to provide a piston 28 of master cylinder 30 with a force to pressurize fluid and supply a brake system with pressurized fluid to effect a desired brake application.

In more particular detail, the power piston 16 has a cylindrical projection 32 that extends through opening 37 in housing 12. The passageway of the power piston includes an axial bore 34 in the cylindrical projection 32 that extends to a plurality of radial cross bores or outlet passages 36,36'. Inlet passages 38 (only one is shown) connect inlet chamber 18 to axial bore 34 while outlet passages 36,36' connect axial bore 34 with the outlet chamber 20. Power piston 16 has a valve seat 40 located in axial bore 34 adjacent the radial cross bores 36,36'.

The control valve 26 which is located in axial bore 34 includes an input rod 42, a valve seal 62, a first cylindrical bearing 48, a reaction spring 56, a second cylindrical bearing 50 and a valve spring 63. The control valve 26 is retained in bore 34 by fixing end cap 35 to cylindrical projection 32. A reaction pin 81 linked to a push rod 14 communicates an operational input from a brake petal to control valve 26.

The input rod 42 has a cylindrical shaft with a first end 44 and a second end 46. The first cylindrical bearing 48 surrounds the input rod 42 adjacent the first end 44 while the second cylindrical bearing 50 surrounds the input rod 42 adjacent the second end 46. The first cylindrical bearing 48 engages a shoulder formed by head 52 on input rod 42 while the second cylindrical bearing 50 is retained on input rod 42 by a snap ring 54 to cage spring 56. The first bearing 48 has a series of slots 58 (only one is shown) which allows fluid to be communicated to a resonance chamber 60 formed in bore 34 between the first bearing 48 and second bearing 50. The valve seal 62 is located in axial bore 34 and urged by valve spring 63 into engagement with the first cylindrical bearing 48. The valve seal 62, first cylindrical bearing 48, valve seat 40 and power piston 16 define a working chamber 64 within bore 34 as more clearly shown in FIG. 2.

The valve seal 62 has a generally cylindrical body 66 with a first end 68 and a second end 70. The first end 68 has face 72 thereon and with valve seat 40 defines a flow path from working chamber 64 to outlet chamber 20 by way of axial bore 34 and the cross bores 36,36'. Cylindrical body 66 has an essentially closed center 74 with a central opening 76. The closed center 74 forms a base for spring 63 while the second end 70 is urged against the first cylindrical bearing 48 to separate the working chamber 64 from the resonance chamber 60. The central opening 76 provides a communication path for that portion of bore 34 downstream of valve seat 40 and the resonance chamber 60. The face 72 of the first end of the cylindrical body 66 has a first ring 78 with a step 80 which transitions into a beveled or conical surface 82 connected to the closed center or base 74.

The valve seal 262 shown in FIG. 3 is essentially identical to valve seal 62 with the exception of face 268 where first 278 and second 279 rings are located adjacent step 280 which transitions into conical surface 282 connected to the center 274.

The valve seal 362 shown in FIG. 4 is essentially identical to valve seal 62 with the exception of face 368 where first 378, second 379 and third 381 rings are located adjacent step 380 which transitions into conical surface 382 connected to the center 374.

Mode of Operation of the Invention

When brake booster 10 is located in a vehicle and the engine is operating in a desired manner, fluid under pressure for a supply system is delivered from a power steering pump through inlet port 90 to inlet chamber 18. Spring 63 urges valve seal 62 into engagement with the first cylindrical bearing 48 to define the working chamber 64 and establish a desired space relationship between ring 78 on the face of valve seal 62 and valve seat 40. Fluid flows between the ring 78 and valve seat 40 through throat 35 into the plurality of radial bores 36,36' for distribution to outlet chamber 20 and out passage 15 to flow switch 17 in return passage 19. Return passage is connected to a reservoir of the steering system through outlet port 21. Fluid on flowing past seat 40 develops a turbulence sound which is substantially constant. This turbulence sound is communicated throughout the entire housing 12 of brake booster 10 and in particular to resonance chamber 60 by way of opening 76 and slots 58 but does not excite the fluid in chamber 60 or other chambers in the brake booster 10 such as inlet chamber 18, working chamber 64 or outlet chamber 20. This noise sound has a measured level of about 30 dB which is within an acceptable noise level for most humans and when added to the other sounds created in an operating vehicle is not normally definable. This same type of operation is effective when flow switch 19 detects that the power steering pump is inoperative and a operator desires to make a brake application such that electric pump 100 is activated and pressurized fluid is supplied to inlet chamber 18 by way of inlet port 90a.

When an operator desires to effect a brake application, an input force is applied to brake pedal to activate control valve 26. The input force is communicated through reaction pin 81 to end 46 of input rod 14 which correspondingly moves valve seal 62 toward valve seat 40 to restrict the flow of fluid from working chamber 64. As the flow of fluid from working chamber 64 is restricted, the fluid pressure in inlet chamber 18 increases and a pressure differential develops across power piston 16. This pressure differential acts on and moves power piston 16 after overcoming return spring 20 to provide a corresponding force which moves piston 28 in master cylinder 30 to pressurize fluid and effect a brake application. As the pressure in chamber 18 increases, a pressure drop occurs immediately downstream from valve seat 40 which defines a turbulence and frequency in the flow of fluid from chamber 18. This turbulence is shifted by ring 78 and sharp step 80 which transitions into conical surface 82 such that the resonant frequency of resonant chamber 60 and other chambers, i.e. inlet chamber 18, working chamber 64 and outlet chamber 20, are not locked in and the sounds created are within acceptable audible limits.

To evaluate the sounds produces by brake booster 10 with a commercial brake booster of a type disclosed in U.S. Pat. No. 4,961,846 a sound meter was used to measure noise. Sounds produced by a standard hydraulic brake booster is illustrated by curve or trace 200 in FIG. 5 while sounds produced by a brake booster 10 equip with valve seal 62 is illustrated by curve or trace 202. Curve 202 demonstrates that brake booster 10 has a lower sound level in a resonance frequency range of approximately 1000 to 20000 Hz which is below 60 dB and within an acceptable audible range. Thus, by modifying the development of turbulence in the flow of fluid moving past the face of seal 62 and seat 40 the sound level is attenuated to an acceptable range.

Limited testing has been performed with the valve seals 262 and 362 which have a plurality of rings to modify the development of turbulence in the fluid flowing past valve seat 40. Such test confirm that a reduction in resonance frequency can be achieved and that such structure may produce an optimum reduction in undesirable sounds.

We claim:

1. A fluid power apparatus comprising a housing with a bore therein which is divided by a power piston into an inlet chamber and an outlet chamber, said power piston having passage means therethrough for connecting said inlet chamber with said outlet chamber, valve means for controlling the flow of a fluid under pressure from a source through said passage means, said valve means including a valve seal, a valve spring and an input rod, said valve spring urging said valve seal into engagement with said input rod to define a working chamber within said passage means, said fluid under pressure flowing from said inlet chamber to said outlet chamber by passing between said valve seal and a valve seat located in said working chamber, said flowing of fluid past said valve seat in a rest mode of operation developing a first turbulence which creates a non-resonant noise having an acceptable audible level of approximately 30 dB, said input rod responding to an actuation force from an operator by moving said valve seal toward said valve seat to restrict the flow of fluid from said working chamber and cause a corresponding fluid pressure change of the fluid in said inlet chamber, said corresponding fluid pressure change acting on said power piston to create an output force, said flowing of fluid from said working chamber to produce said output force creating a second turbulence which produces a resonance noise, said valve seal being characterized by a labyrinth ring having a cylindrical body with a first end and a second end, said first end having a face thereon with at least a first ring and a step which transitions into a conical surface connected to a base with a center opening, said face modifying said turbulence in fluid flowing from said inlet chamber and shifting the frequency of the fluid flowing past said valve seat such that said resonance noise of the fluid is below an acceptable audible range of 65 dB.

2. The fluid power apparatus as recited in claim 1 wherein said first ring of said labyrinth ring reduces the level of turbulence by absorbing kinetic energy to smooth out the flow of fluid.

3. The fluid power apparatus as recited in claim 1 wherein said labyrinth ring is characterized by a plurality of rings such that the level of turbulence is reduced by absorbing kinetic energy to smooth out the flow of fluid.

4. The fluid power apparatus as recited in claim 3 wherein said passage means includes a flow path through said valve seal and a bearing for said input rod for communicating fluid to a resonance chamber.

5. The fluid power apparatus as recited in claim 1 wherein said passage means includes a flow path through said valve seal and a bearing for said input rod for connecting said outlet chamber to a resonance chamber.

6. The fluid power apparatus as recited in claim 5 wherein said conical surface transitions the communication of resonance noise to said resonance chamber by way of said flow path to modify the turbulence caused by fluid flowing to said outlet chamber.

7. The fluid power apparatus as recited in claim 1 wherein said passage includes a flow path through said valve seal and a bearing for said input rod for connecting said outlet chamber to a resonance chamber and said labyrinth ring being characterized by a plurality of rings which are connected to said flow path by said conical surface to reduce turbulence caused by fluid flowing to said outlet chamber.

* * * * *